UNITED STATES PATENT OFFICE.

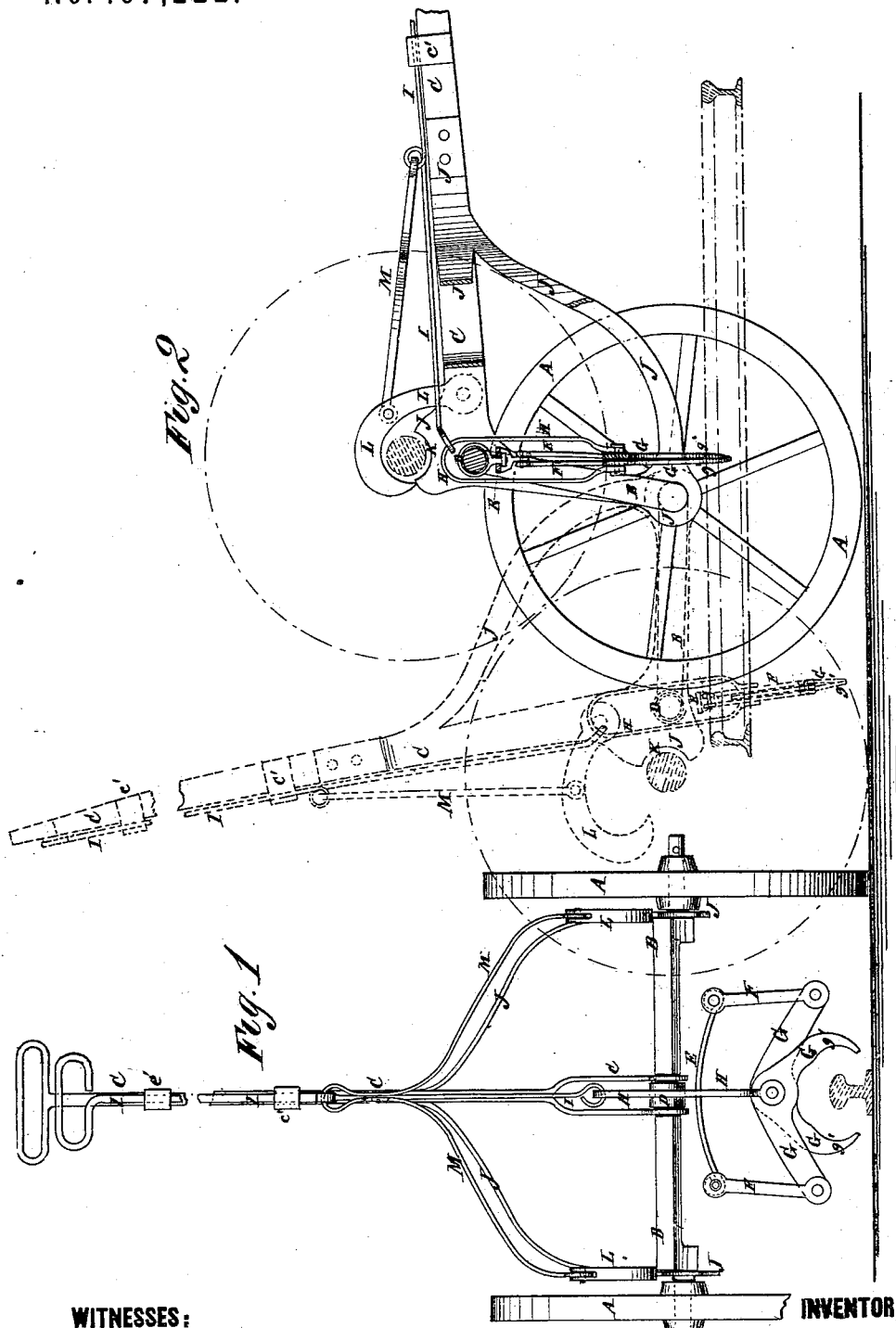

CHARLES W. CARTER, OF TERRE HAUTE, INDIANA, ASSIGNOR TO HIMSELF AND GEORGE W. TRAVIS, OF CAPE GIRARDEAU, MISSOURI.

IMPROVEMENT IN TRUCKS FOR CARRYING RAILS, AXLES, &c.

Specification forming part of Letters Patent No. 167,222, dated August 31, 1875; application filed July 24, 1875.

*To all whom it may concern:*

Be it known that I, CHARLES W. CARTER, of Terre Haute, in the county of Vigo and State of Indiana, have invented a new and useful Improvement in Combined Car-Axle and Railroad-Rail Carrier, of which the following is a specification:

Figure 1 is a rear view of my improved machine, shown in position for picking up a rail. Fig. 2 is a side view, partly in section, of the same, shown in position for carrying the load, and showing in dotted lines its position when picking up a car-axle provided with wheels.

Similar letters of reference indicate corresponding parts.

The object of this invention is to furnish an improved machine, simple in construction and convenient in use, for picking up and carrying car-axles provided with wheels, railroad-rails, bars, shafts, bundles of iron, and other heavy objects.

The invention consists in the combination of the collar or sleeve, the cross-bar, the links or bars, the bent lever-hooks, the loop or U-bar, and the sliding rod with the forked handle, the bent axle, and the wheels, and in the combination of the triangular braces, the concaved seats, the pivoted hooks, the bail, and the sliding rod with the handle, the bent axle, and the wheels, as hereinafter fully described.

A are the wheels, which are fifteen inches, more or less, in diameter, and which revolve upon the journals of the axle B. The axle B is bent four times at right angles, to bring its middle part to a proper height above the ground. To the middle part of the axle B is attached the forked rear end of the tongue or handle C, which is made four feet, more or less, in length, and has a loop or other hand-piece formed upon or attached to its forward end. To the middle part of the axle B, between the forks of the rear end of the handle C, is placed a sleeve or collar, D, to one side of which is attached the center of a cross-bar, E. To the ends of the bar E are pivoted the upper ends of the bars or links F, the lower ends of which are pivoted to the outer ends of the bent levers G, which are pivoted to each other at their angles, and upon the lower ends of which are formed hooks or jaws $g'$, which are so formed as to grasp a railroad-rail, a bar, a shaft, a bundle of iron, or any other object to be moved. To the pivot of the bent lever-jaws G are pivoted the ends of the arms of the loop or U-bar H, which passes around the collar or sleeve D, the axle B, and the cross-bar E, and the bend of which passes through the eye formed upon the rear end of the rod I. The rod I extends forward along the upper side of the handle C, and is made a little shorter than the said handle, so that the hand-piece formed upon or attached to its end may not interfere with the hand-piece of the handle C. The rod I is kept in line with and in place upon the handle C by one or more loops or keepers, $c'$, attached to the said handle, and through which the said rod passes. The connection between the handle C and the axle B is strengthened by the triangular braces J, the upright arm of which passes up along and is secured to the upright part of the axle B, and has a hole in its lower end, through which the journal of the said axle passes. The upper and inclined arms of the triangular brace J project forward, are curved inward and forward, and are secured to the handle C. Upon the upper ends of the upright arms of the triangular braces J are formed half-round notches or concaved projections K, to form seats for a car-axle. L are hooks, the shanks of which are pivoted to the upper arms of the braces J in such positions that the said hooks L may drop down over the concavities or seats K, and hold the car-axle in place. To the hooks L are pivoted the ends of a bail, M, the middle part of which is pivoted to the rod I, as shown in Figs. 1 and 2.

In using the machine for carrying car-axles provided with wheels, the machine is backed up to the axle. The hooks L are raised by pulling upon the rod I. The handle C is then raised until the concavities K rest against the said car-axle, as shown in dotted lines in Fig. 2. The rod I is then released, allowing the hooks L to drop over the axle, and the handle C is lowered, which raises the wheels of the car-axle away from the ground, and allows the axle to be conveniently transported wherever desired. In the same way the bent lever-jaws G are opened and lowered to grasp and pick up a railroad-rail or other object to be carried.

Having thus described my invention, I claim as new and desire to secure by Letters Patent—

1. The combination of the collar or sleeve D, the cross-bar E, the links or bars F, the bent lever-hooks G g', the loop or U-bar H, and the sliding rod I with the forked handle C, the bent axle B, and the wheels A, substantially as herein shown and described.

2. The combination of the triangular braces J, the concaved seats K, the pivoted hooks L, the bail M, and the rod I with the handle C, the bent axle B, and the wheels A, substantially as herein shown and described.

CHARLES W. CARTER.

Witnesses:
GEO. W. TARLTON,
WILLIAM BONNEY.